Figure 1:
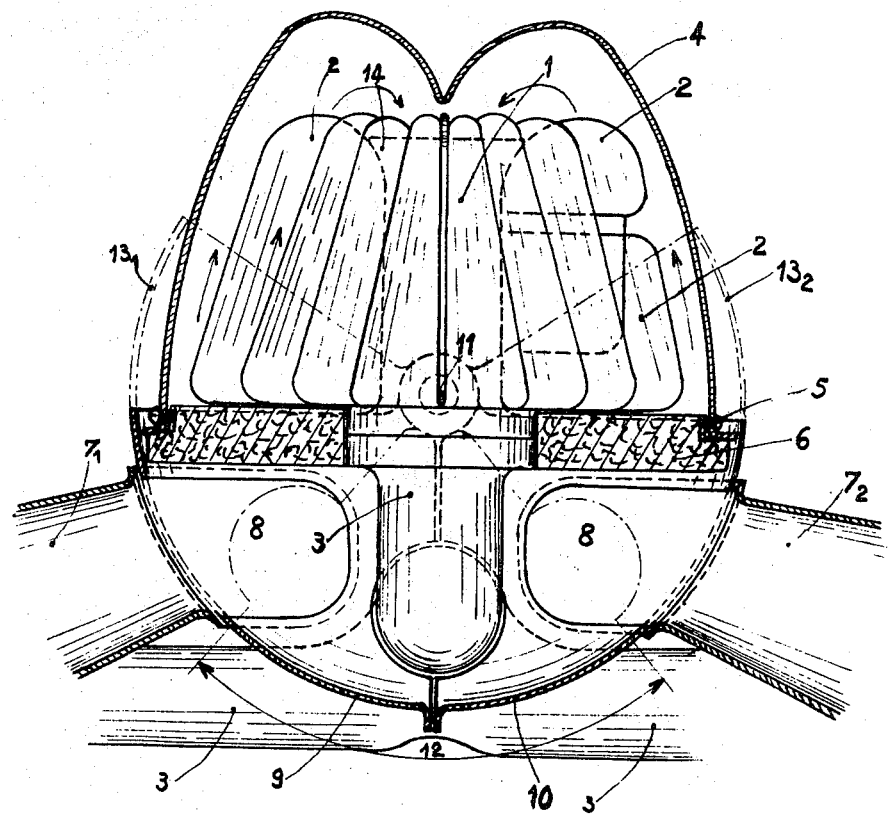

United States Patent

Mangin

[15] 3,673,995
[45] July 4, 1972

[54] INDUCTION AIR TEMPERATURE REGULATORS

[72] Inventor: Jean-Pierre Mangin, Billancourt, France

[73] Assignees: Regie Nationale Des Usines Renault, Billancourt; Automobiles Peugeot, Paris, France

[22] Filed: May 18, 1970

[21] Appl. No.: 38,363

[52] U.S. Cl..................123/122 D, 123/122 A, 123/198 E, 55/DIG. 28, 261/1, 261/145, 261/159
[51] Int. Cl....................................F02m 31/06, F02m 15/00
[58] Field of Search...............123/41.31, 122, 122 A, 122 D, 123/122 H, 142, 195 A, 195 C, 198 E; 261/1, 144, 145, 156, 158, 159, 161; 55/DIG. 28, 276

[56] References Cited

UNITED STATES PATENTS

| | | | |
|---|---|---|---|
| 1,378,867 | 5/1921 | Johnson | 261/145 X |
| 685,993 | 11/1901 | Le Blon | 261/156 X |
| 2,288,696 | 7/1942 | Funderburk | 123/122 D |
| 369,721 | 6/1943 | Fiedler | 261/1 |
| 3,016,890 | 1/1962 | Bibo | 123/122 D |
| 3,285,588 | 11/1966 | Huddle | 123/122 X |

Primary Examiner—Al Lawrence Smith
Attorney—Stevens, Davis, Miller & Mosher

[57] ABSTRACT

Induction air temperature regulator for internal combustion engines, wherein the carburetor is enclosed in a bell-shaped casing, the air sucked through the base of said casing flowing upwards through an annular filter element and along the outer surface of the carburetor, thus ensuring a heat exchange therewith before being sucked through the carburetor to form the combustion mixture. Spherical shutters surround the lower portion of the bell casing and are movable to control the ratio of heated/unheated air entering the carburetor.

9 Claims, 2 Drawing Figures

PATENTED JUL 4 1972

3,673,995

INDUCTION AIR TEMPERATURE REGULATORS

The present invention relates to a device for regulating the temperature of induction air in internal combustion engines.

In internal combustion engines the differences in induction air temperatures which result on the one hand from climatic and seasonal changes and on the other hand from the inherent engine temperature, which have a direct influence on the carburetor temperature by conduction, according to engine speeds and driving, running or load conditions, are a cause of significant irregularities in the combustion conditions and therefore in the engine operation. Abnormally cold combustion products cannot mix properly, and therefore burn incompletely and irregularly. On the other hand at abnormally high temperatures the fuel vaporizes, thus disturbing the proportions and homogeneousness of the mixture. In either case these variations play an important role in the increment of atmospheric pollution by exhaust gas of internal combustion engines, and also in the engine efficiency.

Reducing this pollution by providing an accurate and constant adjustment of combustion conditions is greatly facilitated by a proper regulation of the temperature of the combustion products.

It is known to preheat the engine combustion air during the winter or in cold weather by causing this air to circulate beforehand along the exhaust pipe system.

It is also known through the U.S. patent application, Ser. No. 18,043, filed on Mar. 10, 1970, to perform a regulation, in the cooling direction, of the fuel temperature by means of a heat exchange utilizing a fluid circulation through the carburetor, the cooling fluid consisting for example of the fuel itself.

However, these arrangements constitute but partial solutions to the problem of regulating the temperature of combustion products. This invention constitutes a satisfactory reinforcement and complement of the means broadly set forth hereinabove and is characterized in that the carburetor is enclosed in a bell-shaped circular casing open at its base. An annular filtration element surrounding the inlet end of the suction pipe to which the carburetor is mounted is adapted to close the suction opening at the bottom or base of said casing.

With this arrangement, the induction air is sucked vertically and upwardly, and as the air flows along the external surface of the carburetor during its ascending travel towards the top of the bell-shaped casing, a heat exchange takes place therebetween.

This heat exchange is adapted, by cold weather, to preheat the air stream sucked along the carburetor and conversely by warm weather the carburetor is cooled to a greater extent and thus protected against the detrimental heating thereof by conduction, means being provided for adjusting the air input in order to deliver to the suction surface of the air filter air at the surrounding temperature, preheated air, or a mixture of both as a function of the temperature of the combustion mixture in the induction manifold.

Although this bell-shaped casing and filter arrangement is applicable to all carburetor types, the carburetor's body may advantageously be provided with fins in order to increase considerably its heat exchange surface area. Similarly, the contour of this bell-shaped casing may be designed with a view to create about the carburetor body a suction stream of gradually decreasing cross-sectional surface area of the Venturi type in order to accelerate the air flow speed towards the carburetor inlet opening and thus promote the heat exchange. The air speed at the inlet end of the carburetor may also be increased by resorting to a Venturi or funnel shaped opening. These provisions promote the increment in the velocity of the air flow through the carburetor and consequently the production of a more homogeneous air/fuel mixture through an improved fuel atomization.

Another advantageous feature characterizing this invention is due to the annular shape of the filter which provides a relatively large cross-sectional or filtration area, whether through its peripheral cylindrical lateral surface or through its horizontal flat base surface, thus reducing pressure losses at the suction end of the system.

Another advantageous feature of this invention resides in the fact that it affords a substantial reduction in over-all dimensions of the filter and carburetor assembly, since this assembly is housed within a common capacity within the bell-shaped casing.

Another advantage characterizing this invention is the protection of the carburetor by the bell-shaped casing against any condensation of atmospheric moisture, against any external accidental projection or splashing of mud, stones, gravels and also against the ingress of dust, etc.

Considering the present trend towards a more strict control of engine combustion conditions with a view to reduce atmospheric pollution, sealing the means provided for closing the bell-shaped casing will safely protect the carburetor against tampering by unskilled persons attempting to modify its initial adjustments and thus run the risk of increasing the pollution caused by the engine.

Moreover, making the assembly impervious to any release of fuel vapors will also put same in conformity with the various anti-pollution regulations either in force or to be promulgated within a very short time in connection with the evaporation of gasoline vapors.

It is another advantageous feature of this device that it provides the combination of a carburetor with a filter into a same and single engine feed unit definitely pre-adjusted on the assembly line, so that any adjustment means may be dispensed with in this unit. Under these conditions the assembling may be performed by spot welding or riveting. Thus, manufacturing costs can be reduced considerably.

Repair and overhaul procedure will thus consist simply in replacing the defective units with new ones, thus affording substantial savings in hold-up and maintenance time.

Figure 2:
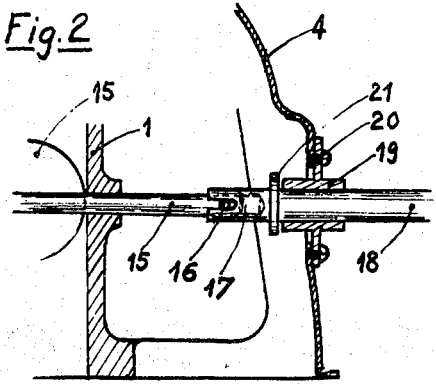

The advantageous features characterizing this invention will appear more clearly in the following description given with reference to the accompanying drawing, in which:

FIG. 1 is a vertical diagrammatic section taken through the assembly comprising the carburetor, the bell-shaped casing and a filter element, together with a device for distributing the air, preheated or not, supplied to the filter element and FIG. 2 is a fragmentary section showing a typical form of embodiment, known per se, of the sealed passage for the carburetor throttle valve control rod.

In FIG. 1, a carburetor 1 provided with vertical radial fins 2 is mounted on an end flange of the induction pipe 3.

This carburetor 1 is covered by a bell-shaped casing 4 secured along its base to the peripheral reinforcing ring 5 of an air filter 6 of annular configuration which surrounds the companion flanges of carburetor 1 and induction pipe 3.

Pipes $7_1$ and $7_2$, communicating with the surface of the exhaust manifold or pipes, supply preheated air to the suction zone 8.

Spherical shutters 9 and 10 pivoting about a common axis 11 are provided for closing partially or completely the pipes $7_1$ and $7_2$ supplying preheated air and simultaneously opening partially or completely a spherical sector 12 opening underneath the induction pipe to permit the ingress of unheated air.

During the operation of the assembly the spherical shutters 9 and 10 compensated by known mechanical means (not shown), such as springs, have their positions controlled by thermostatic means known per se (not shown) responsive to the temperature of the combustion mixture. When this temperature increases the pair of spherical shutters 9 and 10 rotate upwards about the center 11 but away from each other, thus ensuring on the one hand the gradual closing of the preheated air inlet orifices $7_1$ and $7_2$ and on the other hand the gradual opening of the spherical sector 12 to permit the ingress of unheated air by suction. In the maximum opening position of spherical shutters 9 and 10 corresponding to the dash and dot line $13_1$, $13_2$ of FIG. 1, the preheated air inlets $7_1$ and $7_2$ are fully closed and only unheated air sucked through the opened sector 12 flows into the induction pipe 3, then through the filter 5 and penetrates into the bell-shaped casing 4 along the carburetor body 1 and its fins 2, thus cooling the carburetor and increasing its flow rate due to the presence of passages having a gradually decreasing cross-sectional area, until this air penetrates through the Venturi funnel 14 into the carburetor.

When shutters 9 and 10 are closed, as shown in thick lines in FIG. 1, only preheated air is admitted through the supply pipes $7_1$ and $7_2$.

FIG. 2 illustrates in part-sectional and diagrammatic view the bell-shaped casing 4 and carburetor 1, to show the sealed passage of the throttle valve control rod, the throttle valve shaft 15 carrying at its outer end a projecting diametral pin 16 engaging a diametral notch 17 formed in the adjacent tubular end of a control rod 18, this tubular end being adapted to receive the end of said shaft 15, as shown. The control rod 18 is retained in the proper axial position in a socket 19 formed with an integral fastening flange 20 secured by screws or rivets to the lateral wall of the bell-shaped casing 4. The control rod 18 is prevented from escaping from its coupling engagement with shaft 15 by a collar 21 adapted to engage the inner end of socket 19.

The construction of this device from light-alloy or other sheet metal elements assembled with a carburetor body provided with suitable fins and designed in conformity with modern die-casting methods constitutes a low-cost assembly ensuring an efficient and automatic regulation of the temperatures of the air-fuel combustion mixture.

Although the present invention has been described in conjunction with a preferred embodiment, it is to be understood that modifications and variations may be resorted to without departing from the spirit and scope of the invention, as those skilled in the art will readily understand. Such modifications and variations are considered to be within the purview and scope of the invention and appended claims.

I claim:

1. An induction air temperature regulator for internal combustion engines, comprising: a carburetor; a bell-shaped casing having an opening at its base and enclosing said carburetor therein; means for sucking air into said casing through said base portion, along the outer surface of said carburetor to ensure a heat exchange therewith, and then through said carburetor; means, including a filter element, for filtering at least a portion of said air sucked into said casing; venturi-type passages having a decreasing cross section defined in said casing through which said sucked in air flows, the largest cross section of said passages corresponding to the surface area of said filter element; said carburetor having a funnel-shaped air inlet; means for supplying heated and unheated air into said casing; and spherically shaped shutters adjustably mounted on said casing in operative engagement with said means for supplying heated and unheated air, wherein said shutters are adjustable to adjust the ratio of heated to unheated air supplied to said carburetor through said casing.

2. An air induction temperature regulator for internal combustion engines, comprising: a carburetor; a bell-shaped casing, having an open base portion, enclosing said carburetor; at lease one air flow passage defined in said casing; means, including a first air inlet disposed adjacent said base portion, for supplying heated air to said carburetor through said passage; means, including a second air inlet disposed adjacent said base portion, for supplying unheated air to said carburetor through said passage; and means for adjusting the ratio of unheated air to heated air in said carburetor, including a plurality of arcuately shaped movable shutters mounted adjacent said base portion in operative engagement with said air inlets, further comprising: a filter element mounted adjacent said open base portion between said air inlets and said carburetor; and a plurality of said air flow passages have a gradually decreasing cross section, the largest cross section corresponding to the surface area of said filter element.

3. An air induction temperature regulator for internal combustion engines, comprising: a carburetor; a bell-shaped casing, having an open base portion, enclosing said carburetor; at least one air flow passage defined in said casing; means, including a first air inlet disposed adjacent said base portion, for supplying heated air to said carburetor through said passage; means including a second air inlet disposed adjacent said base portion, for supplying unheated air to said carburetor through said passage; and means for adjusting the ratio of unheated air to heated air in said carburetor, including a plurality of arcuately shaped movable shutters mounted adjacent said base portion in operative engagement with said air inlets, further comprising a filter element mounted adjacent said open base portion between said air inlets and said carburetor, wherein the total area of the open passages defined by said first and second air inlets and said plurality of shutters is at least equal to the suction surface area of said filter element, irrespective of the position of said shutters.

4. An air induction temperature regulator for internal combustion engines, comprising: a carburetor; a bell-shaped casing, having an open base portion, enclosing said carburetor; at least one air flow passage defined in said casing; means, including a first air inlet disposed adjacent said base portion, for supplying heated air to said carburetor through said passage; means, including a second air inlet disposed adjacent said base portion, for supplying unheated air to said carburetor through said passage; and means for adjusting the ratio of unheated air to heated air in said carburetor, including a plurality of arcuately shaped movable shutters mounted adjacent said base portion in operative engagement with said air inlets, wherein said shutters substantially surround said open base portion and are apertured to provide a flow of air to said carburetor through at least one of said first and second air inlets.

5. An air induction temperature regulator for internal combustion engines, comprising: a carburetor; a bell-shaped casing having an open base portion and enclosing said carburetor; means for sucking air into said casing through said base portion, along the outer surface of said carburetor to ensure a heat exchange therewith, and then through said carburetor; means, including a filter element disposed in said opening at the base portion, for filtering at least a portion of said air sucked into said casing; and venturi-type passages having a decreasing cross section defined in said casing through which said sucked in air flows, the largest cross section of said passages corresponding to the surface area of said filter element, and adjustable means for varying the temperature of the air supplied to said carburetor.

6. The device according to claim 5, wherein said carburetor has a funnel-shaped venturi-type air inlet.

7. The device according to claim 5, further comprising a plurality of fins provided on the outer surface of said carburetor.

8. The device according to claim 5, further comprising means, including a first air inlet, for supplying heated air to said carburetor through said passages; means, including a second air inlet, for supplying unheated air to said carburetor through said passages; and spherically shaped shutters adjustably mounted on said casing in operative engagement with said means for supplying heated and unheated air, wherein said shutters are adjustable to adjust the ratio of heated to unheated air supplied to said carburetor through said casing.

9. The device according to claim 8, wherein the total area of the open passages defined by said first and second air inlets and said spherically shaped shutters is at least equal to the suction surface area of said filter element, irrespective of the positions of said shutters.

* * * * *

UNITED STATES PATENT OFFICE
CERTIFICATE OF CORRECTION

Patent No. 3673995                           Dated   July 4, 1972

Inventor(s)  Jean-Pierre MANGIN

It is certified that error appears in the above-identified patent and that said Letters Patent are hereby corrected as shown below:

Letters Patent will show the French priority No. 69/16.928 of May 23, 1969. (This was omitted from Letters Patent).

Signed and sealed this 30th day of January 1973.

(SEAL)
Attest:

EDWARD M. FLETCHER, JR.                ROBERT GOTTSCHALK
Attesting Officer                      Commissioner of Patents